April 18, 1944.  J. L. ANDERSON  2,346,718
METHOD OF SCARFING
Filed Feb. 10, 1942

INVENTOR
James L. Anderson
BY
ATTORNEY

Patented Apr. 18, 1944

2,346,718

UNITED STATES PATENT OFFICE 2,346,718

METHOD OF SCARFING

James L. Anderson, Closter, N. J., assignor to Air Reduction Company, Incorporated, New York, N. Y., a corporation of New York Application February 10, 1942, Serial No. 430,209

5 Claims. (Cl. 148—9)

This invention relates to scarfing metal surfaces, and more particularly to the scarfing of surfaces of substantial width by a single pass of a wide oxygen stream.

For removing metal from wide areas it is usual to employ a number of approximately parallel jets which preferably touch one another and merge into a wide stream where they strike the work-piece. The jets may be discharged from separate tips located close to one another transversely across the metal work-piece, or from spaced jet orifices in the face of a block tip, with the jets close enough together to form what is in effect a blanket of oxygen directed against the metal surface. It has been customary to surround each scarfing oxygen orifice with a circle of preheating orifices in accordance with the usual practice with cutting tips. It has also been proposed to direct the scarfing oxygen from a slot orifice extending transversely of the work, and to locate some of the preheating jets above and others below the scarfing oxygen slot.

I have discovered that in scarfing wide areas with a blanket of oxygen directed against the metal surface, a special situation is presented with respect to the preheating flames. I have found that if substantially all of the preheating flames, except those above the oxygen streams, are eliminated, less oxygen is required to remove the same amount of metal.

Although the amount of preheating is reduced, and the preheating jets eliminated are the ones closest to the work-piece and the ones located in position for most effectively heating the work-piece, the efficiency of the scarfing operation is improved. My explanation of this unexpected result is that only a portion of the products of combustion from the preheating flames under the oxygen blanket escape around the sides of the oxygen stream, while the remaining products of combustion move forward over the metal surface and under the oxygen blanket, delaying the contact of the scarfing oxygen with the work-piece and diluting the oxygen, with resulting decrease in the efficiency of the scarfing reaction.

It also appears that more advantageous results are obtained by not having the products of combustion of preheating flames come in contact with the metal surface of the work-piece. With this invention preheating flames above the scarfing oxygen stream radiate heat to the metal of the work-piece, but the gases from the preheating flames preferably do not touch the work-piece.

Objects of the invention are to provide a more efficient method for scarfing metal bodies, and particularly for scarfing wide areas in a single pass; to remove more metal with a given amount of oxygen; and to progressively preheat a metal surface at the region of impingement of a scarfing oxygen stream without introducing diluent gases between the scarfing stream and the surface of the metal work-piece.

Other objects, features, and advantages of the invention will appear or be pointed out as the specification proceeds.

In the accompanying drawing, forming a part hereof:

Figure 3:
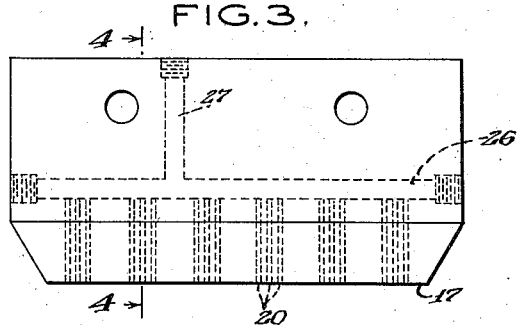
Fig. 3 is an enlarged side elevation of one of the torches shown in Fig. 1.
Figure 4:
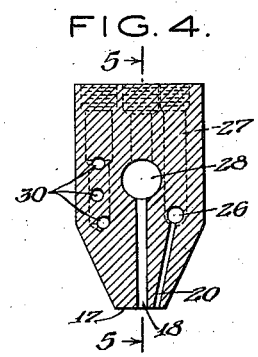
Figure 5:
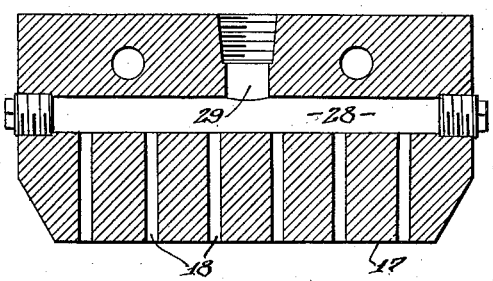

Figs. 4 and 5 are sectional views on the lines 4—4 and 5—5, respectively, of Figs. 3 and 4.

Figure 6:
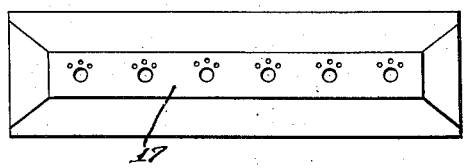

Fig. 6 is a face view of the torch shown in Figs. 3–5.

Figure 1:
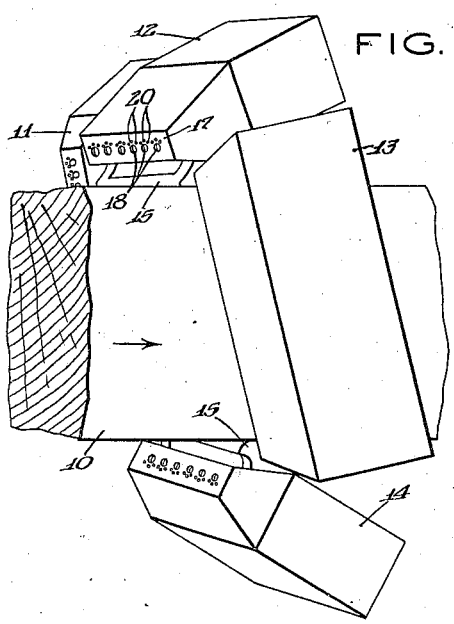
Fig. 1 is a perspective view showing a billet and torches for scarfing the billet by the process of this invention.

A ferrous metal work-piece, shown in Fig. 1 as a billet 10, travels along a mill table or conveyor in the direction indicated by the arrow in the drawing. Scarfing torches 11, 12, 13 and 14 are connected to suitable torch holders, not shown, and are arranged to scarf four sides of the work-piece. On their under sides, that is to say the sides next to the work-piece, they have wear plates 15.

Each torch has a face 17 in which there are orifices 18 for projecting jets of scarfing oxygen against the surface of the billet 10 at an acute angle to the surface when the torch is in its intended orientation with respect to the work-piece. Other jet orifices 20 open through the face 17 and supply fuel, or preferably an oxyfuel gas mixture, for preheating flames.

The orifices 18 are close enough together to deliver, in effect, a blanket of oxygen over the billet surface just ahead of the torch. It is a feature of the process that substantially all of the fuel gas mixture used for preheating is burned in jets located on the side of the oxygen blanket away from the surface of the work, and in the illustration of the invention in the drawing all of the preheating jets are on the side of the oxygen stream away from the work.

Figure 2:
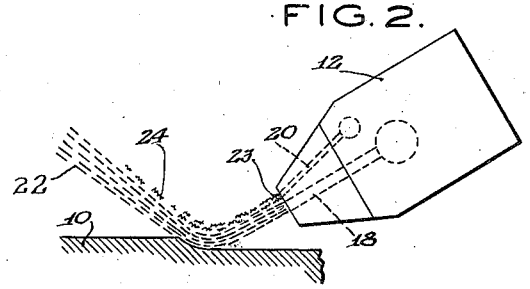
Fig. 2 is an end elevation showing the relation of the preheating jets to the scarfing stream in the torches of Fig. 1.

Fig. 2 shows a section through the streams of gas issuing from the different orifices. The oxygen stream from the scarfing jet orifice 18 is indicated by the long thin lines 22. The primary combustion cones of the preheating flames supplied by the other jet orifices 20, are indicated by the reference character 23, while the envelope gases and products of combustion 24 are shown by short wavy lines in Fig. 2.

In scarfing with a plurality of orifices located close enough to deliver touching oxygen jets that blanket the work-piece, there is insufficient opportunity for the escape of products of combustion from flames under the oxygen stream. When preheating flames are used under such circumstances, the products of combustion from the preheating flames flow forward between the oxygen blanket and the surface of the work-piece, and apparently prevent the oxygen from coming into contact with the work-piece surface as quickly as is the case with no preheating jets under the scarfing stream. Perhaps even more important is the dilution of the scarfing oxygen by the products of combustion of preheating jets located under scarfing oxygen streams in scarfing apparatus of the prior art.

With this invention the gases 24 from the preheating flames 23 do not dilute the scarfing oxygen. Although the preheating jet orifices are preferably inclined toward the work-piece at a somewhat greater acute angle than are the scarfing oxygen jets, the velocity of the preheating flame jets is not sufficient to cause them to intersect the scarfing stream prior to the reaction of the scarfing oxygen with the metal of the work-piece.

In accordance with the preferred embodiment of this invention, the preheating jets 23 heat the metal of the work-piece by radiation through the oxygen stream and there is no contact between the work-piece and the preheating flames or the products of combustion from the preheating flames. The oxygen stream receives heat directly from the preheating flames.

The surface of the billet is heated to a kindling temperature before starting the scarfing operation. Then the scarfing oxygen jets are directed against the surface of the billet and the surface ahead of the torch is heated progressively to kindling temperature, during relative movement of the billet and torches, by the combined heating of the preheating flame jets 23 and the reaction of the scarfing oxygen with the metal of the billet.

Fig. 3 shows a distributing chamber 26 in the torch tip for supplying the oxy-fuel gas mixture to all of the preheating jet orifices 20. The gas mixture is supplied to the distributing chamber 26 through a conduit 27.

Fig. 4 shows a distributing chamber 28 in the tip separate and independent of the chamber 26. All of the scarfing oxygen jet orifices 18 lead from the distributing chamber 28 and oxygen is supplied to the chamber 28 through a conduit 29.

There are passages 30 in the tip for the circulation of cooling fluid, usually water.

This application is a continuation-in-part of my copending application Serial No. 257,941, filed February 23, 1939, now Patent No. 2,277,472, issued March 24, 1942.

Terms of orientation in the description and claims are, of course, relative. For example, the preheating jets described as above the scarfing jets when operating on the top surface of the billet in Fig. 1, are below the scarfing jets when operating on the bottom face of the billet. Various changes and modifications can be made in the illustrated embodiment of the invention, and some features of the invention can be used without others.

I claim:

1. The method of removing metal from the surface of a ferrous metal work-piece, comprising directing a plurality of scarfing jets against the work-piece with the metal at ignition temperature, and with the scarfing jets at an acute angle to the surface and closely spaced so that they remove the metal from touching areas of the surface of the work-piece, and heating the work-piece during the scarfing operation by means of flames directed toward the work-piece at an acute angle somewhat greater than the angle at which the scarfing jets are directed against the work-piece and with substantially all of the preheating flames located above the streams of scarfing oxygen.

2. In the scarfing of a ferrous metal work-piece by directing a number of touching oxygen jets against the surface of the work-piece with the metal of said surface at ignition temperature, causing relative movement of the oxygen jets and the work-piece, and heating the surface of the work-piece during the scarfing operation by means of oxy-fuel gas preheating flames, the improvement that comprises directing the scarfing oxygen jets from a level closer to the work-piece than the level at which the preheating flames originate to prevent products of combustion of said preheating flames from contacting with the oxygen jets on the sides of the jets nearest the work-piece.

3. The method of removing metal from the surface of a work-piece, comprising directing a plurality of scarfing jets against the work-piece with the metal at ignition temperature, and with the scarfing jets closely spaced so that they remove the metal from touching areas of the surface of the work-piece, heating the surface of the work-piece during the scarfing operation by radiation from high intensity flames, and positioning substantially all of the flames so that neither they nor their products of combustion come into contact with the surface of the work-piece.

4. The method of removing surface metal from a ferrous metal body, which method comprises directing scarfing oxygen against the surface at an acute angle to said surface and across sufficient width of the surface to form in effect a blanket of oxygen of substantially greater width than thickness, causing relative movement of the stream and the metal body lengthwise of the metal body, and raising the surface metal to a kindling temperature progressively along the metal body with the assistance of heat from the combustion of fuel gas, substantially all of which is burned in preheating flames located on the side of the oxygen blanket remote from the surface against which the scarfing oxygen is directed.

5. The process for scarfing a ferrous metal work-piece, which process comprises directing a blanket of scarfing oxygen against the surface while producing relative movement of the work-piece and blanket of scarfing oxygen lengthwise of said work-piece, and projecting preheating flames at an acute angle toward the surface of the work-piece from sources substantially all of which are on the far side of the blanket from the work-piece so that the products of combustion from the preheating flames do not come in contact with the surface of the work-piece.

JAMES L. ANDERSON.